UNITED STATES PATENT OFFICE.

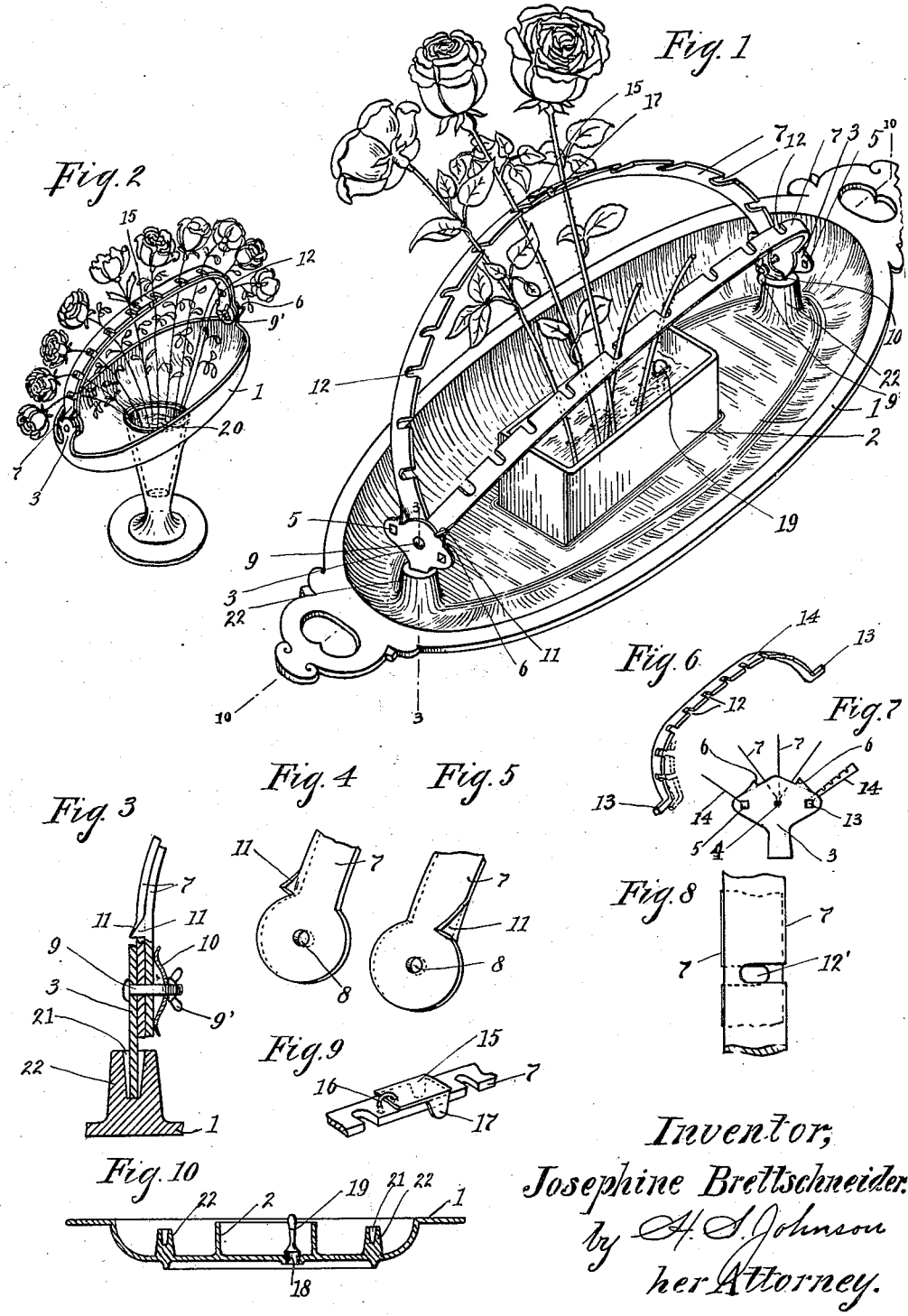

JOSEPHINE BRETTSCHNEIDER, OF ST. PAUL, MINNESOTA.

FLOWER RECEPTACLE.

1,423,906.

Specification of Letters Patent.  Patented July 25, 1922.

Application filed February 23, 1922. Serial No. 538,666.

*To all whom it may concern:*

Be it known that I, JOSEPHINE BRETTSCHNEIDER, a citizen of the United States, residing at St. Paul, in the county of Ramsey and State of Minnesota, have invented certain new and useful Improvements in Flower Receptacles, of which the following is a specification.

This invention relates to flower holding receptacles for holding cut flowers, and has for one of its objects to provide, in devices of this character, movable flower supporting means, which may be selectively positioned on the receptacle, to produce various decorative or ornamental arrangements of the flowers, said means being specially constructed to enable flowers to be displayed with stems appreciably longer than the usual length to which they are ordinarily cut for display in ordinary vases. Further, my invention contemplates the provision of means, whereby the flowers may be displayed in spread out form, so that a large part of the foilage may be left on the stems, as distinguished from the compulsory practice of cutting away the larger part of the foliage to enable the bouquet to be inserted into the mouth of an ordinary vase, it being well known, that cut flowers will last longer when long stems and the original foliage can be retained.

To this end the invention consists in the construction, combination and arrangement of parts hereinafter described and claimed.

In the drawings forming part of this specification;

Figure 1, is a perspective view of a flower holder embodying my invention.

Fig. 2, is a perspective view of the invention showing it applied to a bowl having a hollow standard.

Fig. 3, is an enlarged sectional view on line 3—3 of Fig. 7.

Figs. 4 and 5 are enlarged perspective views of the respective pivot ends of the flower supporting bows.

Fig. 6, is a perspective view of one of the removable bows drawn to a reduced scale.

Fig. 7, is a diagrammatic view of one of the hinge lugs, showing four bows in spread position thereon, and a pair in vertical position.

Fig. 8, is an enlarged top view of a section of two bows in superposed relation.

Fig. 9, is a perspective view of a section of one of the bows, showing the hasp thereon, and Fig. 10, is a sectional view on line 10—10 of Fig. 1.

In the drawings, 1 designates a tray or bowl which may be adapted to contain liquid and which may be of any conventional design, and 2 a secondary receptacle adapted to contain liquid, appreciably smaller than the bowl and which may be of any suitable depth irrespective of the depth of the bowl. The bowl is formed with oppositely disposed widely spaced upright hinge members or lugs 3, said lugs made preferably of metal plate and oval in form, and positioned parallel to each other. Each of the lugs, is perforated by a central pivot opening 4, and a pair of rectangular openings 5 spaced laterally, one on either side of the central opening, the upper edge of the lug having spaced inwardly facing shoulders 6 between the openings 5, one on either side of the pivot opening. Pivotally supported by the lugs 3, are the flower supporting bows or bails 7, each of said bows formed preferably, of a thin flat strip of uniform width, curved to bring the free ends thereof into parallelism, and having pivot openings 8 in said ends to receive the headed pivot pins 9. The bails of which there may be two or more, are adapted to fit flatly one within the other so as to nest in superposed relation, the pivot openings 8 being positioned in the individual bails to bring the openings of all the bails into alinement to receive the pivot pins 9. Thus, the superposed bails are collectively pivoted on the lugs by means of the pins 9, which latter extends through the lugs 3, and the spring plate washers 10, the pins being suitably threaded to receive the thumb nut 9′, whereby to hold the spring washers under stress to press the bail ends frictionally together. The bails may be swung inwardly and held to any position desired. For the purpose of holding the bails to a definite outswung position symmetrically on either side of the pivot 9, each bail is provided with outwardly extending ears 11 adapted to engage with the shoulders 6 when in outswung position, as shown in Figure 1. The bails may, however, be frictionally held at any intermediate position. The inner edge of each of the bails is here shown formed with spaced notches 12, adapted to sustain the flower stems in spaced order, said notches being arranged to register when the bails are brought into superposed relation as shown in Figure 8, which shows the notches of sufficient depth to overlap each other and thereby effect a clear opening 12'. Long stems of roses, immersed at their lower extremities in the water of the flower supply receptacle 2, may be arranged to rest in said notches (as shown in Figure 1) to bring the blossoms into ornamental order as desired, the foliage being left undisturbed.

An additional pair of bails may be added and positioned as indicated in Figure 2, the stems being projected through the opening 12' and held locked therein. By overlapping the notches, I am enabled to hold locked, slender stemmed flowers in vertical position, without disturbing the foilage, inasmuch as the flowers are first laid into the notches of one bail, and then locked into position by swinging the companion bail into superposed or locking position.

For the purpose of having readily removable bails, I provide the preferably square openings 5 adapted to freely receive the squared terminals 13 of the readily detachable bail 14. The detachable bail is inserted, by springing the ends toward each other, and then permitting the terminals to enter the respective openings 5, the terminals being arranged on the bail to support the latter in the position indicated in Figure 7.

For the purpose of more firmly locking the flowers in a pair of bails (as when large heavy blossoms are to be held) I provide the hasp 15, pivoted by means of the staple 16 to the upper side of the uppermost bail. The hasp has downwardly directed lugs 17 to embrace the opposite edges of two or more bails, as the case may be.

For the purpose of rendering it unnecessary to disarrange the flowers, when it is desired to change the water in the receptacle, I provide a discharge opening 18 in the bottom thereof, and a stopper 19 to stop the opening, said stopper having suitable handle extending above the water level so that it may be manipulated therefrom. The receptacle 2 and the water therein may be termed a water supply tank for the flowers, positioned within the water holding area of the tray, it being an object of the invention to provide a water holding tray, if desired, for the purpose of placing gold fish therein.

In Figure 2, I have shown a modified form of bowl and receptacle, 20 designating a cup to contain water from the flowers.

In Figure 3, the hinge lug 3, is shown resting in a socket 21, in the end of a boss 22, which latter forms an integral part of the bowl, which structure is designed for porcelain bowls. The lugs are secured in the sockets by suitable cement properly tamped around the shanks of the lugs. However, it is to be understood that my improved flower holder may be made of silver plate and the like as indicated in Figure 2, wherein the hinge lugs are positioned on the edge of the bowl.

I claim:

1. A flower holding device, comprising a liquid container, supports for bows on opposite sides of said container, bows mounted on said supports to incline outwardly to opposite sides thereof, said bows extending between said supports and adapted to loosely embrace the stems of flowers extending from said container to hold the stems in spaced order, the mounting of said bows including frictional pivotal connections, between the bows and said supports whereby to enable said bows to be swung toward each other and be frictionally held at various positions on said supports.

2. In a flower holder, the combination with a water container; of bows swingingly mounted to swing over said container toward each other into superposed relation, and notches in the adjacent edges of said bows, said notches formed to overlap each other to collectively form a surrounding space adapted to hold a flower stem.

3. A flower holder comprising an open top liquid container, upwardly diverging bows extending beyond opposite sides of said container adapted to sustain at predetermined points, the flower stems which extend from said container, supporting means for pivotally supporting opposite ends of said bows to render the bows swingable toward each other, said pivotal supporting means including means for holding the bows selectively positioned.

4. In a flower receptacle, the combination, a hollow receptacle, a liquid container to receive the ends of the flower stems located in the hollow of said receptacle, bows adapted to loosely embrace and hold spaced the upwardly extending flower stems, swingingly mounted on said receptacle to swing respectively from a vertical position above said container to predetermined positions at opposite sides of said container.

5. In a flower receptacle, the combination, a hollow receptacle, a liquid container, to receive the ends of the flower stems, located in the hollow of said receptacle, bows having notches adapted to loosely sustain the flower stems spread out in a row said bows pivotally mounted to swing to a limited degree over said container beyond either side thereof, openings at opposite sides of said receptacle near the pivots of said bows, and readily detachable bows having extensions at their free ends adapted to be readily extended into said openings to hold the detachable bows in flower sustaining position.

6. In a flower receptacle of the class described, the combination, a bowl, a water container appreciably smaller than the bowl located within the latter, and a plurality of bows extending above said container, between points spaced outwardly from opposite ends thereof, said bows having upwardly opening notches spaced at intervals intermediate their ends, each notch adapted to receive the upwardly directed stem of a flower, and means for movably supporting said bows to change their relative position with respect to said container.

7. In a flower receptacle, a bowl, a water container appreciably smaller than the bowl located within the latter, a pair of perforated lugs, one on either side of said container, and spring bows having upwardly opening spaced notches intermediate their ends adapted to be projected into the perforations of said lugs, to be thereby held in flower holding position when said bows are sprung.

8. In a flower receptacle, a bowl, a water container appreciably smaller than the bowl located within the latter, supports on opposite sides of said container, bows having upwardly opening spaced notches intermediate their ends adapted to receive the upwardly directed stems of flowers, and cooperating locking means between the free ends of said bows and said supports, whereby said bows may be readily locked in flower holding position on said supports.

9. In a flower holder, the combination with a bowl, and a water container within the bowl; of bows swingably mounted to swing over said container toward each other into superposed position, said bows adapted to sustain at intervals intermediate their ends, upwardly extending stems of flowers, and means for locking said bows in superposed position.

In testimony whereof I affix my signature.

JOSEPHINE BRETTSCHNEIDER.